(12) United States Patent
Rains (10) Patent No.: US 7,693,635 B2
(45) Date of Patent: Apr. 6, 2010

(54) METHOD FOR LEARNING THE FLOW RATE OF HYDRAULIC FLUID IN AN AUTOMATIC TRANSMISSION

(75) Inventor: Mark A. Rains, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 1050 days.

(21) Appl. No.: 11/386,137

(22) Filed: Mar. 22, 2006

(65) Prior Publication Data

US 2007/0221462 A1    Sep. 27, 2007

(51) Int. Cl.
G06F 7/00 (2006.01)
G06F 17/00 (2006.01)

(52) U.S. Cl. .............................. 701/51; 701/67; 701/58; 701/68; 192/3.3; 477/156

(58) Field of Classification Search .................... 701/62, 701/64, 66, 51, 58, 67–68; 192/3.3; 73/118.1; 474/28, 45; 477/156; 370/1
See application file for complete search history.

(56) References Cited

U.S. PATENT DOCUMENTS

| | | | | |
|---|---|---|---|---|
| 4,671,139 A | * | 6/1987 | Downs et al. | 477/148 |
| 4,706,522 A | * | 11/1987 | Nitz | 477/61 |
| 4,707,789 A | * | 11/1987 | Downs et al. | 701/58 |
| 4,768,632 A | * | 9/1988 | Moan | 192/3.3 |
| 4,913,004 A | * | 4/1990 | Panoushek et al. | 477/155 |
| 4,951,200 A | * | 8/1990 | Leising et al. | 701/58 |
| 5,029,087 A | * | 7/1991 | Cowan et al. | 701/68 |
| 5,058,716 A | * | 10/1991 | Lippe et al. | 192/3.33 |
| 5,072,390 A | * | 12/1991 | Lentz et al. | 701/60 |
| 5,163,540 A | * | 11/1992 | Mainquist et al. | 192/3.3 |

(Continued)

FOREIGN PATENT DOCUMENTS

CA    2197812 A  *  8/1997

(Continued)

OTHER PUBLICATIONS

Nonlinear air-to-fuel ratio and engine speed control for hybrid vehicles; Wagner, J.R.; Dawson, D.M.; Liu Zeyu; Vehicular Technology, IEEE Transactions on; vol. 52, Issue 1, Jan. 2003 pp. 184-195; Digital Object Identifier 10.1109/TVT.2002.807156.*

(Continued)

Primary Examiner—Cuong H Nguyen
(74) Attorney, Agent, or Firm—Quinn Law Group, PLLC (57) ABSTRACT

The present invention provides a method for approximating the flow rate of hydraulic fluid in an automatic transmission. The method includes estimating a flow rate value for each of a plurality of temperatures. Thereafter, the current transmission temperature is measured. The flow rate corresponding to the current transmission temperature is then learned in the following manner. The process of learning the flow rate initially includes identifying the presence of a predefined shift aberration. If the predefined shift aberration was not identified, the flow rate estimation corresponding to the current transmission temperature is iteratively adjusted. If the predefined shift aberration was identified, the flow rate estimation corresponding to the current transmission temperature is reversed by one iterative step thereby providing the learned flow rate value for the current transmission temperature.

20 Claims, 3 Drawing Sheets

U.S. PATENT DOCUMENTS

| | | | | |
|---|---|---|---|---|
| 5,216,606 | A | * | 6/1993 | Lentz et al. .................... 701/66 |
| 5,251,734 | A | * | 10/1993 | Benford et al. ............... 192/3.3 |
| 5,612,874 | A | * | 3/1997 | Schulz et al. .................. 701/51 |
| 5,799,260 | A | * | 8/1998 | Droste et al. ................... 701/51 |
| 5,802,490 | A | * | 9/1998 | Droste ........................ 701/51 |
| 5,890,509 | A | * | 4/1999 | Becker et al. .......... 137/115.26 |
| 5,910,175 | A | * | 6/1999 | Malson ........................ 701/57 |
| 6,078,856 | A | * | 6/2000 | Malson ........................ 701/57 |
| 6,115,661 | A | * | 9/2000 | Hosseini et al. ............... 701/51 |
| 6,116,391 | A | * | 9/2000 | Kremmling et al. ........ 192/3.58 |
| 6,285,942 | B1 | * | 9/2001 | Steinmetz et al. ............. 701/67 |
| 6,292,732 | B1 | * | 9/2001 | Steinmetz et al. ............. 701/67 |
| 6,625,536 | B1 | * | 9/2003 | Vohmann et al. ............. 701/67 |
| 6,695,111 | B1 | * | 2/2004 | Bai ............................ 192/3.3 |
| 6,732,037 | B2 | * | 5/2004 | Jeon ............................ 701/51 |
| 7,011,603 | B2 | * | 3/2006 | Kobayashi et al. ............ 477/62 |
| 7,130,733 | B2 | * | 10/2006 | Mussaeus et al. ............. 701/55 |
| 7,292,922 | B2 | * | 11/2007 | Chen et al. .................... 701/51 |
| 2004/0020194 | A1 | * | 2/2004 | Nishimura et al. ............ 60/297 |
| 2004/0144607 | A1 | * | 7/2004 | Back et al. ................... 192/3.3 |
| 2005/0269181 | A1 | * | 12/2005 | Gierer et al. ................. 192/3.3 |
| 2007/0054775 | A1 | * | 3/2007 | Chen et al. .................. 477/121 |
| 2007/0203670 | A1 | * | 8/2007 | Earle ......................... 702/188 |
| 2007/0221462 | A1 | * | 9/2007 | Rains ......................... 192/3.3 |

FOREIGN PATENT DOCUMENTS

| | | | | |
|---|---|---|---|---|
| CN | 101042187 | A | * | 9/2007 |
| DE | 60301646 | E | * | 2/2006 |
| DE | 102007013018 | A1 | * | 10/2007 |
| EP | 1382812 | A1 | * | 1/2004 |
| EP | 1826727 | A2 | * | 8/2007 |
| GB | 2310469 | A | * | 8/1997 |
| IN | 2007001782 | I2 | * | 10/2007 |
| JP | 2005226619 | A | * | 8/2005 |
| JP | 2005321014 | A | * | 11/2005 |

OTHER PUBLICATIONS

Dynamic characteristic analysis of laminar flow meter; Funaki, T.; Kawashima, K.; Kagawa, T.; SICE 2003 Annual Conference vol. 1, 2003 pp. 850-855.*

Achieving application level fairness through utility-based wireless fair scheduling; Xia Gao; Nandagopal, T.; Bharghavan, V.; Global Telecommunications Conference, 2001. GLOBECOM '01. IEEE; vol. 6, Nov. 25-29, 2001 pp. 3257-3261 vol. 6 Digital Object Identifier 10.1109/GLOCOM.2001.966288.*

A Smart Multiple-Loop Automotive Cooling System-Model, Control, and Experimental Study; Salah, M. H.; Mitchell, T. H.; Wagner, J. R.; Dawson, D. M.; Mechatronics, IEEE/ASME Transactions on; vol. 15, Issue 1, Feb. 2010 pp. 117-124 Digital Object Identifier 10.1109/TMECH.2009.2019723.*

Convective heat transfer for water-based alumina nanofluids in a single 1.02-mm tube; Lai, W.Y.; Phelan, P.E.; Vinod, S.; Prasher, R.; Thermal and Thermomechanical Phenomena in Electronic Systems, 2008. ITHERM 2008. 11th Intersociety Conference on; May 28-31, 2008 pp. 970-978; Digital Object Identifier 10.1109/ITHERM.2008.4544372.*

Modeling and control for NCS with time-varying long delays; Ye Yang; Yong-Ji Wang; Machine Learning and Cybernetics, 2005. Proceedings of 2005 International Conference on; vol. 3, Aug. 18-21, 2005 pp. 1407-1411 vol. 3; Digital Object Identifier 10.1109/ICMLC.2005.1527164.*

Challenges and opportunities in automotive transmission control; Zongxuan Sun; Hebbale, K.; American Control Conference, 2005. Proceedings of the 2005; Jun. 8-10, 2005 pp. 3284-3289 vol. 5; Digital Object Identifier 10.1109/ACC.2005.1470477.*

* cited by examiner

| FLOW RATE TABLE ||
|---|---|
| TEMP | FLOW RATE |
| -40 C | 500 cc/sec |
| 0 C | 510 cc/sec |
| 40 C | 520 cc/sec |
| 80 C | 530 cc/sec |
| 120 C | 540 cc/sec |

METHOD FOR LEARNING THE FLOW RATE OF HYDRAULIC FLUID IN AN AUTOMATIC TRANSMISSION

TECHNICAL FIELD

The present invention pertains generally to a method for learning the flow rate of hydraulic fluid in an automatic transmission.

BACKGROUND OF THE INVENTION

Generally, a motor vehicle automatic transmission includes a number of gear elements coupling its input and output shafts, and a related number of torque establishing devices such as clutches and brakes that are selectively engageable to activate certain gear elements for establishing a desired speed ratio between the input and output shafts. As used herein, the term "torque transmitting device" will be used to refer to brakes as well as clutches.

The transmission input shaft is connected to the vehicle engine through a fluid coupling such as a torque converter, and the output shaft is connected directly to the vehicle wheels. Shifting from one speed ratio to another is performed in response to engine throttle and vehicle speed, and generally involves releasing one or more clutches (off-going) associated with the current or attained speed ratio and applying one or more clutches (on-coming) associated with the desired or commanded speed ratio.

The speed ratio is defined as the transmission input speed or turbine speed divided by the output speed. Thus, a low gear range has a high speed ratio and a higher gear range has a lower speed ratio. Shifts from one speed ratio to another require precise timing in order to achieve high quality shifting. The quality of shift depends on the cooperative operation of several functions, such as pressure changes within the clutch apply chambers and the timing of control events. Moreover, manufacturing tolerances in each transmission, changes due to wear, variations in oil quality and temperature, etc., lead to shift quality degradation.

SUMMARY OF THE INVENTION

The method of the present invention includes estimating a flow rate value for each of a plurality of temperatures. Thereafter, the current transmission temperature is measured. The flow rate corresponding to the current transmission temperature is then learned in the following manner. The process of learning the flow rate initially includes identifying the presence of a predefined shift aberration. If the predefined shift aberration was not identified, the flow rate estimation corresponding to the current transmission temperature is iteratively adjusted. If the predefined shift aberration was identified, the flow rate estimation corresponding to the current transmission temperature is reversed by one iterative step thereby providing the learned flow rate value for the current transmission temperature.

The process of learning the flow rate may be performed only after the completion of a shift from which the flow rate is to be learned.

The process of learning the flow rate may be performed only if the measured transmission temperature is outside a predefined normal operating temperature range.

The process of learning the flow rate may be performed only if the completed shift occurred at the normal shift point.

The process of learning the flow rate may be performed only if the maximum engine speed during the shift from which the flow rate is to be learned was less than a predefined engine speed value.

The process of learning the flow rate may be performed only if a transmission pump speed is adequate to regulate pressure.

The method for approximating the flow rate of hydraulic fluid in an automatic transmission may also include storing the learned flow rate value into a non-volatile memory device.

The method for approximating the flow rate of hydraulic fluid in an automatic transmission may also include decreasing the iterative step after the flow rate value has been learned.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
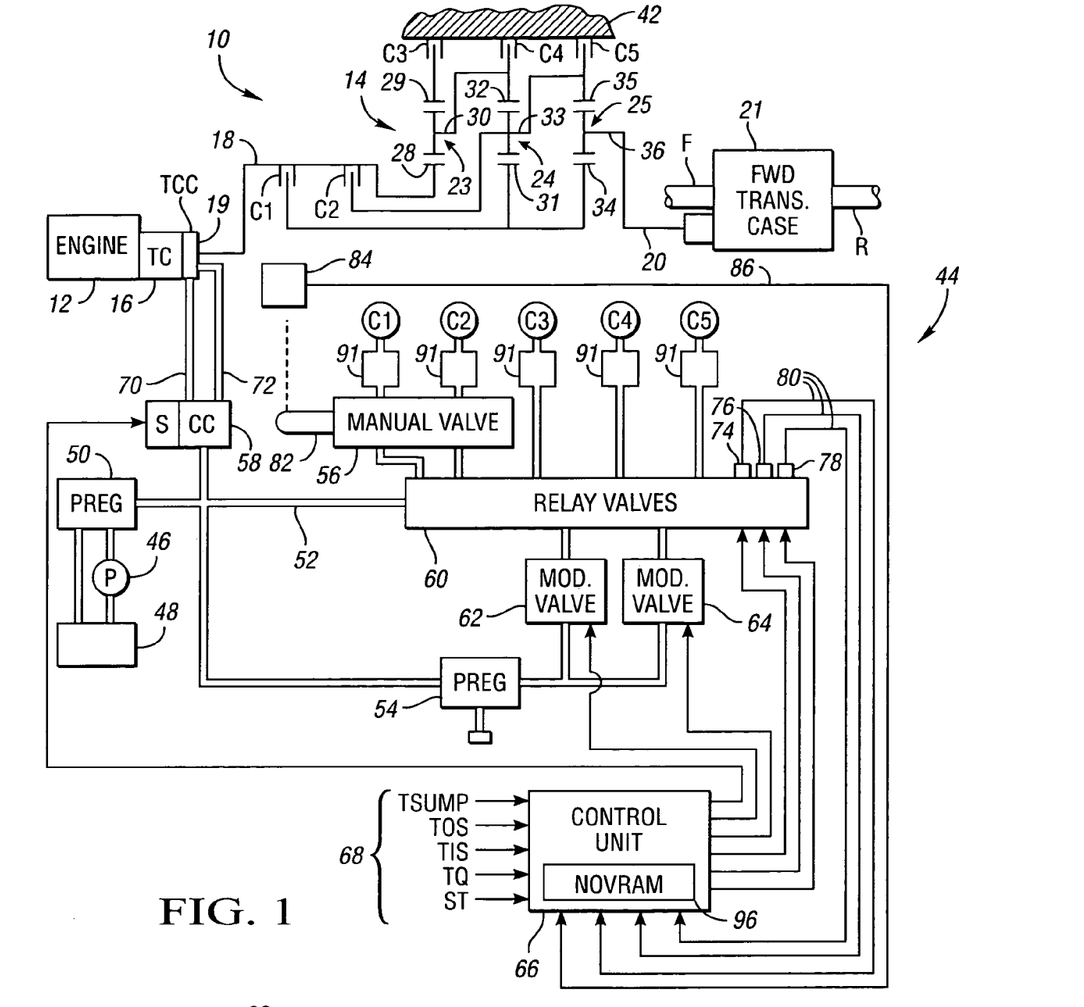
FIG. 1 is a schematic illustration of a vehicle power train in accordance with the present invention.

Referring to the drawings wherein like characters represent the same or corresponding parts through the several views, there is shown in FIG. 1 a schematic illustration of an exemplary vehicle power train 10. It should be appreciated that the power train 10 is shown for illustrative purposes, and that the present invention is also applicable to alternate power train configurations. The vehicle power train 10 preferably includes an engine 12, a transmission 14, and a torque converter 16 providing a fluid coupling between the engine 12 and a transmission input shaft 18.

A torque converter clutch or TCC 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (4WD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

The state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example, the transmission 14 is downshifted from second to first by disengaging clutch C4 while engaging clutch C5.

The torque converter clutch 19 and the transmission clutches C1-C5 are controlled by an electro-hydraulic control system, generally designated by reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle, and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58-64 based on a number of inputs 68 to achieve a desired transmission speed ratio. Such inputs include, for example, signals representing the transmission input speed TIS, a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5. Valves 62, 64 are of the modulated type. For any selected ratio, the control unit 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber 91 of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. A typical control strategy involves commanding a maximum on-coming clutch pressure for an empirically determined clutch fill time. The clutch fill time can be calculated based on the clutch volume and the flow rate according to the equation: clutch fill time="clutch volume"/"flow rate". The "clutch volume" is the volume of fluid required to fill a clutch apply chamber and thereby cause the clutch to gain torque capacity. The "flow rate" is the rate at which hydraulic fluid is transferred to the clutch apply chamber.

According to the preferred embodiment, the on-coming clutch volume is calculated or "learned" in the manner disclosed in commonly assigned U.S. Pat. No. 6,915,890 issued to Whitton et al., and which is hereby incorporated by reference in its entirety. Advantageously, the "learned" on-coming clutch volume can account for build variations and tolerances, and can also account for variation over time due to wear. For purposes of the present invention, a "learned value" is value that is estimated using an adaptive process. The adaptive process is so named because the process is adaptable or variable to reflect new information and thereby account for changes over time.

It has been observed that the flow rate of the hydraulic fluid being transferred to a clutch apply chamber is temperature dependent. Conventionally, the flow rate was measured at a wide variety of temperatures to generate a flow rate curve. Generating flow rate curves requires extensive hot and cold testing such that the flow rate curves are expensive and time consuming to produce. It is therefore an object of the present invention learn the flow rate without reliance on extensive testing.

According to the preferred embodiment of the present invention, the flow rate is first roughly estimated in a conventional manner (e.g., based on a nominal flow rate or on previously compiled test data) at a plurality of temperatures, and is thereafter learned at such temperatures to provide a more accurate estimation. The learned flow rate values and their corresponding temperatures are preferably stored as a table in a non-volatile memory device such as the non-volatile random access memory (NOVRAM) 96. Advantageously, the NOVRAM 96 retains information after losing power such that the flow rate data saved therein is not lost when the vehicle is shut off.

Figure 2:
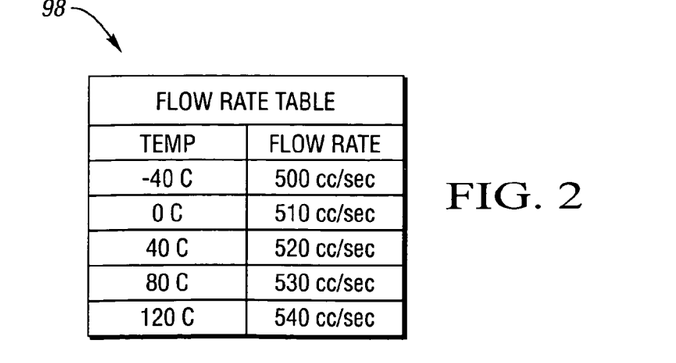
FIG. 2 is an exemplary table on which estimated flow rate values corresponding to a plurality of temperatures are stored.

Referring to FIG. 2, an exemplary flow rate table 98 as stored in the NOVRAM 96 (shown in FIG. 1) is shown. The flow rate data of FIG. 2 is representative of the initial rough estimates for flow rate at the plurality of different temperatures (i.e., −40, 0, 40, 80 and 120 degrees Celsius). It should be appreciated that table 98 of FIG. 2 is merely illustrative, and that the estimated flow rate values and/or the listed temperatures may be varied as required to meet the needs of a particular application.

Each time the flow rate is learned at one of the temperatures included in table 98, the learned flow rate value is saved to the table thereby replacing any previously estimated value. The learned flow rate data is retrievable from the table 98 to calculate the clutch fill time of the on-coming clutch for subsequent ratio changes. If a measured temperature falls between two temperatures included in table 98, the corresponding flow rate can be obtained by interpolation.

Figure 3:
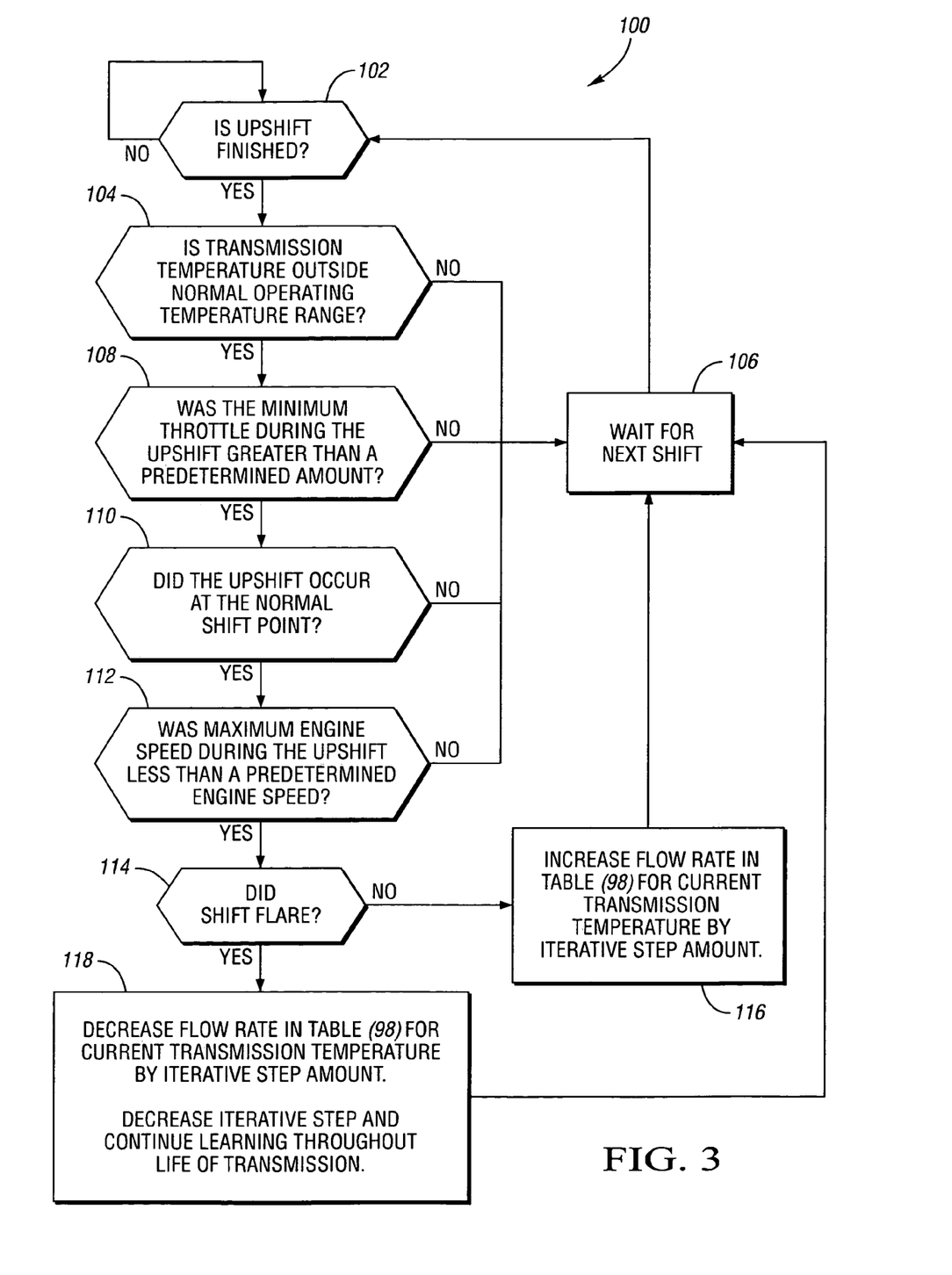
FIG. 3 is a flow chart illustrating a method of estimating flow rate based on a preceding upshift.

Referring to FIG. 3, a method 100 (also referred to herein as algorithm 100) for learning a flow rate during an upshift is shown. More precisely, FIG. 3 shows a block diagram representing steps performed by a control device such as the control unit 66 (shown in FIG. 1).

At step 102, the algorithm 100 determines whether an upshift from which the flow rate is to be learned is completely finished. This step is implemented to ensure the upshift has been completed before the process of learning from the upshift is initiated. If, at step 102, the upshift has not yet been completed, the algorithm 100 repeats step 102. If, at step 102, the upshift has been completed, the algorithm 100 proceeds to step 104.

At step 104, the algorithm 100 determines whether the current transmission temperature is outside a predefined normal operating range (e.g., between 70 and 100 degrees Celsius). The current transmission temperature is obtainable using temperature sensors (not shown) configured to measure and transmit temperature data to the control unit 66 (shown in FIG. 1). The flow rate within the normal operating range is preferably estimated based on a nominal hydraulic fluid flow rate value and the method of the present invention is applied to learn the flow rate only when the current transmission temperature is outside this range. Therefore, if the current transmission temperature is within the predefined normal operating range, the algorithm 100 proceeds to step 106 at which the algorithm 100 waits for the next upshift, and thereafter the algorithm 100 returns to step 102. If the current transmission temperature is outside the predefined normal operating range, the algorithm 100 proceeds to step 108.

At step 108, the algorithm 100 determines whether the minimum throttle input to the engine 12 (shown in FIG. 1) during the upshift was greater than a predetermined amount. This step is implemented because the method of the present invention learns the flow rate during an upshift in response to an engine flare condition, which is described in detail hereinafter, and such engine flare may not be detectable unless the minimum engine throttle is greater than a predetermined amount. Therefore, if the minimum engine throttle is below the predetermined amount, the algorithm 100 proceeds to step 106 at which the algorithm 100 waits for the next upshift, and thereafter the algorithm 100 returns to step 102. If the minimum engine throttle is equal to or greater than the predetermined amount, the algorithm 100 proceeds to step 110.

At step 110, the algorithm 100 determines whether the previous upshift occurred at the normal shift point. This step is implemented because the method of the present invention preferably does not learn from an upshift unless it occurs at the normal shift point. As an example, if the vehicle operator overrides the normally scheduled shift point by manually moving the shift selector (not shown), timing information pertaining to the manual shift is not implemented to learn the flow rate. Therefore, if the previous upshift did not occur at the normal shift point, the algorithm 100 proceeds to step 106 at which the algorithm 100 waits for the next upshift, and thereafter the algorithm 100 returns to step 102. If the previous upshift did occur at the normal shift point, the algorithm 100 proceeds to step 112.

At step 112, the algorithm 100 determines whether the maximum engine speed during the upshift was less than a predetermined speed. This step is implemented because the method of the present invention learns flow rate in response to an engine flare condition, which is described in detail hereinafter, and such engine flare may not be detectable if the engine speed is high enough to induce engine output limits such as with a governor (not shown). Therefore, the maximum engine speed during the upshift was equal to or greater than the predetermined speed, the algorithm 100 proceeds to step 106 at which the algorithm 100 waits for the next upshift, and thereafter the algorithm 100 returns to step 102. If the maximum engine speed during the upshift was less than the predetermined speed, the algorithm 100 proceeds to step 114.

At step 114, the algorithm 100 determines if engine flare has been identified. Engine flare is a shift aberration wherein the on-coming clutch gains capacity late resulting in a condition similar to the neutral gear speed ratio. Engine flare is preferably identified when the turbine speed or the transmission input speed, which can be measured with a speed sensor, rises more than a predetermined amount (e.g., 50 rpm) above the commanded gear speed. If engine flare has not been identified at step 114, the algorithm 100 proceeds to step 116. If engine flare has been identified at step 114, the algorithm 100 proceeds to step 118.

At step 116, the algorithm 100 iteratively increases the estimated flow rate value in the table 98 (shown in FIG. 2) corresponding to the current transmission temperature. The "iterative step" is the amount by which the flow rate value is increased, and is configurable to meet the needs of a particular application. According to the preferred embodiment, the iterative step is larger before a flow rate value is learned for the first time, and after a particular flow rate value has been learned the iterative step is reduced. As an example, the iterative step before a flow rate value is learned may be 10 cc/second, and thereafter be reduced to 2 cc/second. If the current transmission temperature falls between two of the temperatures listed in table 98, a flow rate estimation is obtainable by interpolating or scaling between the flow rate values in table 98 that correspond to the two closest temperatures.

At step 118, the algorithm 100 reduces the estimated flow rate value in the table 98 (shown in FIG. 2) corresponding to the current transmission temperature by one iterative step. As engine flare was identified at step 114, the estimated flow rate value used to calculate clutch fill time during the previous ratio change is likely to be too high. Therefore, the estimated flow rate is reduced at step 118 by one iterative step to provide a closer approximation of the actual flow rate. The iteratively reduced flow rate is the "learned" flow rate value for the current transmission temperature and is saved into the table 98. If the current transmission temperature falls between two of the temperatures listed in table 98, a flow rate estimation is obtainable by interpolating or scaling between the flow rate values in table 98 that correspond to the two closest temperatures. Also at step 118, after the flow rate value has been learned as described hereinabove, the iterative step for this value is preferably reduced to a minimal value (e.g., 2 cc/second) so that the process of learning can continue throughout the life of the vehicle and thereby account for changes to the system over time. The reduction of the iterative step is optional and is predicated on the assumption that the previously learned flow rate value is close to the actual and therefore any changes to the learned flow rate should be relatively small.

Figure 4:
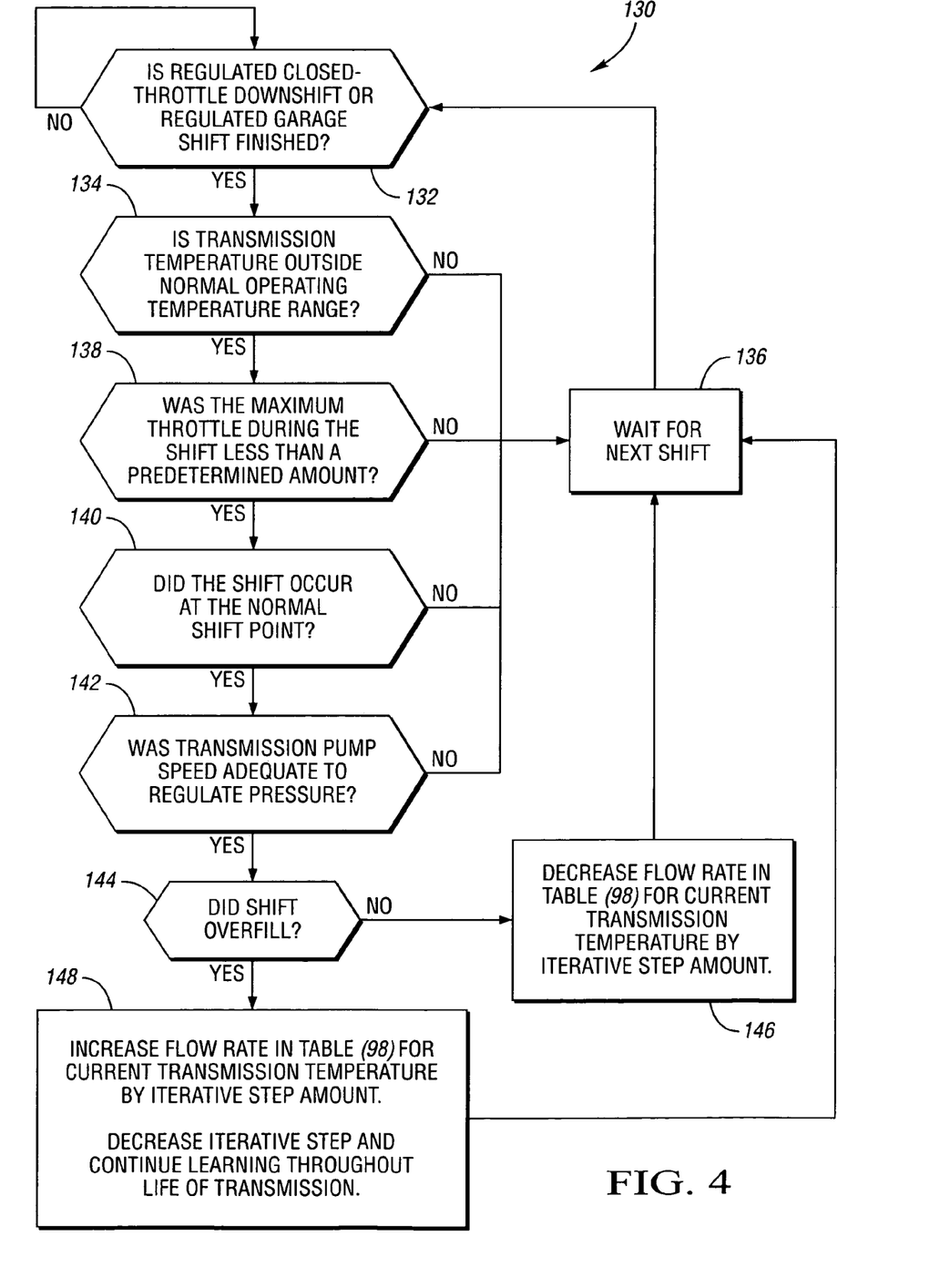
FIG. 4 is a flow chart illustrating a method of estimating flow rate based on a preceding regulated closed throttle downshift or a regulated garage shift.

Although the present invention has been described only as being applicable to upshifts, other shift types may be envisioned. Referring to FIG. 4, a method 130 (also referred to herein as algorithm 130) for learning a flow rate during a "regulated closed-throttle downshifts" or a "regulated garage shift" is shown. More precisely, FIG. 4 shows a block diagram representing steps performed by a control device such as the control unit 66 (shown in FIG. 1). For purposes of the present invention, the term "regulated" refers a shift which takes place while the transmission pump 46 (shown in FIG. 1) is capable of meeting the pressure requirements of the hydraulic system. A non-regulated shift may take place, for instance, when the pump 46 is being driven by the engine 12 (shown in FIG. 1) and the engine 12 is operating at low speeds. A "closed throttle downshift" is a downshift taking place with zero throttle input to the engine 12. A "garage shift" is a shift from neutral to drive or from neutral to reverse.

At step 132, the algorithm 130 determines whether the "regulated closed-throttle downshift" or the "regulated garage shift" from which the flow rate is to be learned is completely finished. This step is implemented to ensure the shift has been completed before the process of learning from the shift is initiated. If, at step 132, the shift has not yet been completed, the algorithm 130 repeats step 132. If, at step 132, the shift has been completed, the algorithm 130 proceeds to step 134.

At step 134, the algorithm 130 determines whether the current transmission temperature is outside a predefined normal operating range (e.g., between 70 and 100 degrees Celsius). The current transmission temperature is obtainable using temperature sensors (not shown) configured to measure and transmit temperature data to the control unit 66 (shown in FIG. 1). The flow rate within the normal operating range is preferably estimated based on a nominal hydraulic fluid flow rate value and the method of the present invention is applied to learn the flow rate only when the current transmission temperature is outside this range. Therefore, if the current transmission temperature is within the predefined normal operating range, the algorithm 130 proceeds to step 136 at which the algorithm 130 waits for the next "regulated closed-throttle downshift" or the next "regulated garage shift", and thereafter the algorithm 130 returns to step 132. If the current transmission temperature is outside the predefined normal operating range, the algorithm 130 proceeds to step 138.

At step 138, the algorithm 130 determines whether the maximum throttle input to the engine 12 is less than a predetermined amount. This step is implemented because the method of the present invention learns the flow rate during a "regulated closed-throttle downshift" or a "regulated garage shift" in response to an overfill condition, which is described in detail hereinafter, and such overfill may be falsely detected unless the maximum engine throttle is less than a predetermined amount. If throttle is applied during a "regulated closed-throttle downshift", the increase in turbine speed could be caused by either an overfilled condition or the off-going clutch releasing prematurely and letting the input speed be increased by the increase in engine torque. However, if throttle is near zero, torque is neutral or negative and an increase in input speed would only be caused by an overfilled condition. Therefore, if the maximum engine throttle is greater than or equal to the predetermined amount, the algorithm 130 proceeds to step 136 at which the algorithm 130 waits for the next "regulated closed-throttle downshift" or the next "regulated garage shift", and thereafter the algorithm 130 returns to step 132. If the maximum engine throttle is less than the predetermined amount, the algorithm 130 proceeds to step 140.

At step 140, the algorithm 130 determines whether the previous "regulated closed-throttle downshift" or "regulated garage shift" occurred at the normal shift point. This step is implemented because the method of the present invention preferably does not learn from a shift unless it occurs at the normal shift point. As an example, if the vehicle operator overrides the normally scheduled shift point by manually moving the shift selector (not shown), timing information pertaining to the manual shift is not implemented to learn the flow rate. Therefore, if the previous "regulated closed-throttle downshift" or "regulated garage shift" did not occur at the normal shift point, the algorithm 130 proceeds to step 136 at which the algorithm 130 waits for the next "regulated closed-throttle downshift" or the next "regulated garage shift", and thereafter the algorithm 130 returns to step 132. If the previous "regulated closed-throttle downshift" or "regulated garage shift" did occur at the normal shift point, the algorithm 130 proceeds to step 142.

At step 142, the algorithm 130 determines whether speed at which the transmission pump 46 (shown in FIG. 1) is being driven is sufficient to meet the needs of the hydraulic system. This step is implemented to ensure the previous shift was regulated because, as previously indicated, the method 130 is preferably only applied to regulated shifts. The determination made at step 142 may be based on a conventional speed sensor attached to the engine 12 and/or the pump 46. If the transmission pump speed is not sufficient to meet the needs of the hydraulic system, the algorithm 130 proceeds to step 136 at which the algorithm 130 waits for the next "regulated closed-throttle downshift" or the next "regulated garage shift", and thereafter the algorithm 130 returns to step 132. If the transmission pump speed is sufficient to meet the needs of the hydraulic system, the algorithm 130 proceeds to step 144.

At step 144, the algorithm 100 determines if an overfill condition has been identified. Overfill is a shift aberration wherein the on-coming clutch gains capacity too soon. Overfill during a "regulated closed-throttle downshift" is preferably identified when the turbine speed or the transmission input speed, which can be measured with a speed sensor, increases before it is scheduled to do so. Overfill during a "regulated garage shift" is preferably identified when the turbine speed or the transmission input speed, which can be measured with a speed sensor, decreases before it is scheduled to do so. If overfill has not been identified at step 144, the algorithm 130 proceeds to step 146. If overfill has been identified at step 144, the algorithm 130 proceeds to step 148.

At step 146, the algorithm 130 iteratively decreases the estimated flow rate value in the table 98 (shown in FIG. 2) corresponding to the current transmission temperature. According to the preferred embodiment, the iterative step is larger before a flow rate value is learned for the first time, and after a particular flow rate value has been learned the iterative step is reduced. If the current transmission temperature falls between two of the temperatures listed in table 98, a flow rate estimation is obtainable by interpolating or scaling between the flow rate values in table 98 that correspond to the two closest temperatures.

At step 148, the algorithm 130 increases the estimated flow rate value in the table 98 (shown in FIG. 2) corresponding to the current transmission temperature by one iterative step. As overfill was identified at step 144, the estimated flow rate value used to calculate clutch fill time during the previous ratio change is likely to be too low. Therefore, the estimated flow rate is increased at step 148 by one iterative step to provide a closer approximation of the actual flow rate. The iteratively increased flow rate is the "learned" flow rate value for the current transmission temperature and is saved into the table 98. If the current transmission temperature falls between two of the temperatures listed in table 98, a flow rate estimation is obtainable by interpolating or scaling between the flow rate values in table 98 that correspond to the two closest temperatures. Also at step 148, after the flow rate value has been learned as described hereinabove, the iterative step for this value is preferably reduced to a minimal value (e.g., 2 cc/second) so that the process of learning can continue throughout the life of the vehicle and thereby account for changes to the system over time. The reduction of the iterative step is optional and is predicated on the assumption that the previously learned flow rate value is close to the actual and therefore any changes to the learned flow rate should be relatively small.

While the best modes for carrying out the invention have been described in detail, those familiar with the art to which this invention relates will recognize various alternative designs and embodiments for practicing the invention within the scope of the appended claims.

The invention claimed is:

1. A method for approximating the flow rate of hydraulic fluid in an automatic transmission comprising:
   estimating a flow rate value for each of a plurality of temperatures;
   measuring a current transmission temperature; and
   learning the flow rate corresponding to the current transmission temperature, said learning including:
      identifying a presence of a predefined shift aberration;
      iteratively adjusting the flow rate estimation corresponding to the current transmission temperature if the predefined shift aberration was not identified; and
      altering the flow rate estimation corresponding to the current transmission temperature by one iterative step if the predefined shift aberration was identified, said altered flow rate estimation representing the learned flow rate value for the current transmission temperature.

2. The method of claim 1, wherein said learning the flow rate is performed only after a completion of a shift from which the flow rate is to be learned.

3. The method of claim 2, wherein said learning the flow rate is performed only if the measured transmission temperature is outside a predefined normal operating temperature range.

4. The method of claim 3, wherein said learning the flow rate is performed only if the completed shift occurred at a normal shift point.

5. The method of claim 4, wherein said learning the flow rate is performed only if a maximum engine speed during the shift from which the flow rate is to be learned was less than a predefined engine speed value.

6. The method of claim 4, wherein said learning the flow rate is performed only if a transmission pump speed is adequate to regulate pressure.

7. The method of claim 4, further comprising storing said learned flow rate value into a non-volatile memory device.

8. The method of claim 4, further comprising decreasing the iterative step after the flow rate value has been learned.

9. A method for approximating the flow rate of hydraulic fluid in an automatic transmission comprising:
   estimating a flow rate value for each of a plurality of temperatures;
   measuring a current transmission temperature;
   learning the flow rate corresponding to the current transmission temperature, said learning including:
      identifying a presence of an engine flare condition;
      iteratively increasing the flow rate estimation corresponding to the current transmission temperature if the engine flare condition was not identified; and
      reducing the flow rate estimation corresponding to the current transmission temperature by one iterative step if the engine flare condition was identified, said reduced flow rate estimation representing the learned flow rate value for the current transmission temperature; and
   storing the learned flow rate value for the current transmission temperature in a non-volatile memory device.

10. The method of claim 9, wherein said learning the flow rate is performed only after a completion of an upshift from which the flow rate is to be learned.

11. The method of claim 10, wherein said learning the flow rate is performed only if the measured transmission temperature is outside a predefined normal operating temperature range.

12. The method of claim 11, wherein said learning the flow rate is performed only if a minimum engine throttle during a preceding upshift is greater than a predetermined amount.

13. The method of claim 12, wherein said learning the flow rate is performed only if the preceding upshift occurred at a normal shift point.

14. The method of claim 13, wherein said learning the flow rate is performed only if a maximum engine speed during the preceding upshift was less than a predefined engine speed value.

15. A method for approximating the flow rate of hydraulic fluid in an automatic transmission comprising:
   estimating a flow rate value for each of a plurality of temperatures;
   measuring a current transmission temperature;
   learning the flow rate corresponding to the current transmission temperature, said learning including:
      identifying a presence of an overfill condition;
      iteratively decreasing the flow rate estimation corresponding to the current transmission temperature if the overfill condition was not identified; and
      increasing the flow rate estimation corresponding to the current transmission temperature by one iterative step if the overfill condition was identified, said increased flow rate estimation representing the learned flow rate value for the current transmission temperature; and
   storing the learned flow rate value for the current transmission temperature in a non-volatile memory device.

16. The method of claim 15, wherein said learning the flow rate is performed only after a completion of a regulated closed-throttle downshift or a regulated garage shift.

17. The method of claim 16, wherein said learning the flow rate is performed only if the measured transmission temperature is outside a predefined normal operating temperature range.

18. The method of claim 17, wherein said learning the flow rate is performed only if the preceding regulated closed-throttle downshift or regulated garage shift occurred at a normal shift point.

19. The method of claim 18, wherein said learning the flow rate is performed only if a transmission pump speed is adequate to regulate pressure.

20. The method of claim 19, further comprising decreasing the iterative step after the flow rate value has been learned.

* * * * *